Patented July 28, 1936

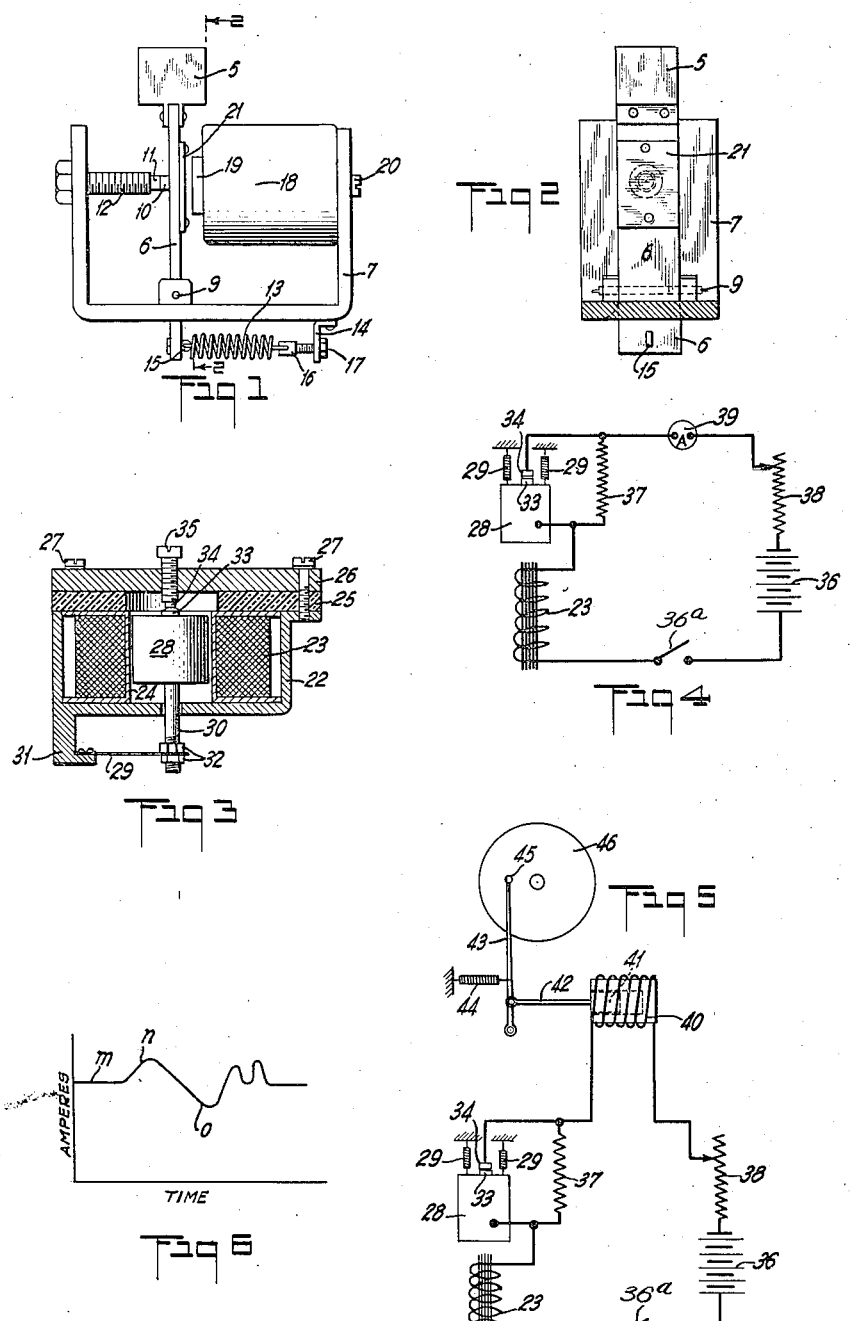

2,049,129

UNITED STATES PATENT OFFICE 2,049,129

ELECTRICAL MEASURING INSTRUMENT

Charles I. McNeil, Bloomfield, N. J., assignor, by mesne assignments, to Eclipse Aviation Corporation, East Orange, N. J., a corporation of New Jersey Application June 16, 1932, Serial No. 617,624

13 Claims. (Cl. 177—351)

This invention relates to measuring instruments, and more particularly to accelerometers for measuring the rate of change of speed of a moving body.

One of the objects of the present invention is to provide a novel instrument of the electrical type for measuring the acceleration of a moving body upon which the same is mounted such as, for example, an automobile or an airplane.

Another object of the invention is to provide a novel instrument for measuring the component of an accelerating force along any desired axis.

A further object is to provide an instrument employing novel means for measuring and recording the magnitude, duration and direction of the accelerating forces acting upon a body on which the same is mounted.

A still further object of the invention is to provide a novel method for determining the acceleration of a body or the acceleration forces acting upon said body.

The above and further objects and novel features of this invention will more fully appear from the following detail description when taken in connection with the accompanying drawing. It is to be expressly understood, however, that the drawing is for the purpose of illustration only and is not designed as a definition of the limits of the invention, reference being primarily had for this purpose to the appended claims.

In the drawing wherein like reference characters refer to like parts throughout the several views:

Fig. 1 is a side elevation view of one form of inertia unit that may be employed in an accelerometer embodying the present invention;

Fig. 2 is a transverse sectional view taken on line 2—2 of Fig. 1;

Fig. 3 is a side elevation, partly in section, of a second form of inertia unit which may be employed in carrying out the invention;

Fig. 4 is a diagrammatic view of an instrument embodying the invention;

Fig. 5 is a diagrammatic view illustrating a recording instrument embodying the present invention; and Fig. 6 is a sample graphic record obtained with the device of the present invention.

The novel accelerometer comprehended by the present invention includes an inertia unit, one embodiment of which is illustrated in Figs. 1 and 2. As shown, said unit comprises a weight or mass 5 secured to the upper end of an arm 6 which is pivotally mounted on the lower central portion of a U-shaped member 7 by means of a pin 9. An electrical contact 10 is secured to arm 6 intermediate mass 5 and pin 9, said contact being adapted to engage a contact 11 mounted on an adjusting screw 12 threaded through one side of member 7.

Resilient means are provided for normally holding contacts 10, 11 in closed position and, as illustrated, such means are constituted by a coil spring 13. The latter is connected, under tension, to the lower end of arm 6 and to a bracket 14, carried by member 7, as by means of suitable eyes 15 and 16, the latter being provided with an adjusting nut 17 for varying the tension of said spring.

Electro-magnetic means are provided for moving mass 5 and arm 6 to break contacts 10, 11 against the tension of spring 13 and, as shown, such means consist of a coil 18 surrounding a soft iron core 19, the two being mounted by means of a screw 20 on an arm of member 7. When coil 18 is energized, core 19 exerts a pull upon a soft iron plate 21 secured to arm 6 thereby moving the latter and opening contacts 10, 11. A suitable source of electric energy, such as a storage battery, is provided for energizing coil 18 as will be pointed out more fully hereafter.

The above-described unit is preferably employed in an accelerometer adapted for measuring the acceleration of a body in horizontal or near horizontal planes. When measuring accelerations in a substantially vertical plane, the inertia unit preferably comprises a housing 22 (Fig. 3) in which is placed a coil 23 wound on spool 24, the latter being held in place by spacing plate 25 and a cover 26 which are secured to housing 22 by means of screws 27.

The movable mass responsive to accelerating forces consists of a member 28 slidably mounted in the center of spool 24 in the form of a solenoid plunger or armature and supported so that its center of gravity is at a point above the horizontal center of coil 23 by means of a flat spring 29. The latter is riveted at one end to a horizontal arm at the lower end of a downwardly extending projection 31 on housing 22 and is adjustably secured at its other end by means of adjusting nuts 32 arranged on either side thereof to a rod 30 extending downwardly from mass 28.

A pair of electrical contacts 33, 34, corresponding to contacts 10, 11 above, are respectively mounted in the top of mass 28 and on an adjusting screw 35 threaded into cover 26. Spring 29 tends to maintain contacts 33, 34 closed while the magnetic pull of coil 23 tends to move mass 28 downwardly toward the horizontal center of said coil to open said contacts and divert the current through a high resistance circuit to coil 23 thereby reducing its pull on mass 28.

Either of the above described inertia units are adapted to be incorporated in a continuously closed circuit which includes a battery 36 and the coil of the unit, the normal path of current from battery to coil being through contacts 33, 34 when the unit of Fig. 3 is used. When the contacts are open, the current flows through a resistance shunt 37, thus reducing the flow of current to coil 23 to such value that the effective pressure of spring 29 is greater than the magnetic attraction of solenoid 23 for plunger 28. If desired, a rheostat 38 may be provided for regulating the current flowing from battery 36, and a switch 36a for opening the circuit when the same is not in use. Suitable means are provided for measuring the average flow of current therein and, as shown, such means consists of an ammeter 39.

In normal operation, current flows from battery 36 through ammeter 39, contacts 33, 34, coil 23 and back to the battery. The current flowing in this circuit energizes coil 23 sufficiently to pull mass 28 downwardly against the tension of spring 29 to open contacts 33, 34. The current then flows through the shunt resistance 37 which reduces the current value and so weakens the pull of coil 23 that spring 29 is effective to again raise mass 28 closing contacts 33, 34 and the cycle is repeated in rapid succession, thereby virtually vibrating mass 28. This cycle of events is such, in actual practice, that the inertia of the parts of ammeter 39 causes the latter to measure the average current drawn by the accelerometer. When no accelerating forces are acting upon mass 28, its effective inertia will remain constant and the frequency of the vibrations of said mass will also be constant. Thus, the average value of the current will not change and a normal indication determined by the setting of rheostat 38 will be given by ammeter 39. If, however, the instrument is moving downwardly as viewed in Fig. 3, a positive accelerating force will tend to raise weight 28, thus effectively increasing its inertia as respects the movement imparted to it by coil 23. Under these conditions, a greater interval of time is required to sufficiently energize coil 23 to pull mass 28 down for opening contacts 33, 34, whereas the interval during which a reduced current flows remains substantially constant. The average current therefor will increase during acceleration and a larger indication will be shown by ammeter 39. If, now, a retarding or negative accelerating force is imposed, weight 28 tends to move downwardly, thus decreasing its effective inertia and making it easier for coil 23 to attract mass 28 for opening contacts 33, 34. The interval during which said contacts are closed is thus decreased below normal and the average current drawn by the instrument is likewise decreased causing an indication of below normal to be shown by ammeter 39.

If it is desired to measure acceleration in a horizontal plane, the inertia unit shown in Fig. 1 is preferably employed in lieu of the unit shown in Fig. 3.

Suitable means may be provided for measuring and recording the average value of current flowing in coil 23 and, in the illustrated embodiment (Fig. 5), such means comprises a recording ammeter which may consist of a coil 40 adapted to exert a magnetic pull on a plunger 41. The latter is connected by means of a link 42 to a pivoted recording arm 43. A spring 44 interposed between arm 43 and a stationary part is provided for yieldingly resisting the pull of plunger 41 on said arm. On the upper end of arm 43 is mounted a pencil 45 which engages a record sheet 46. The latter may be rotated by means of clockwork (not shown), thus creating a graphic record with time as abscissae. As in ammeter 39, the inertia of the parts of the recording apparatus causes plunger 41 to be responsive to the average current in coil 40 thereby making the pull of said plunger upon arm 43 proportional to the average current in said coil. The ordinates of the graph may, therefore, be read in terms of amperes.

A sample graphic record obtained from the above device is illustrated in Fig. 6. When the average current is steady, that is, when no acceleration forces are acting upon mass 28, a straight line such as "m" is recorded, said line having an ordinate representing the normal average current predetermined by the setting of rheostat 38. A rise in current due to acceleration will cause the graph to curve upwardly as at "n" while a fall in average current value as is brought about by a negative acceleration will cause the graph to curve below the normal line "m" as at "o". In either event, as soon as acceleration ceases, the curve returns to the normal line "m". If the acceleration should be constant for a measurable period of time, a straight line graph would be obtained above or below line "m" depending on whether the acceleration was positive or negative.

Since the average value of the measured current is dependent upon the accelerating forces acting upon the instrument, or upon the body on which the same is mounted, the former may be translated into terms of acceleration. We have, then, a graphic picture showing the magnitude, duration and direction (i. e. positive or negative) of the accelerating forces to which the unit has been subjected. In the case of the apparatus shown in Fig. 4, ammeter 39 may be provided with a scale calibrated in terms of acceleration for giving an observer a visual indication of instantaneous rates of change of speed.

The measurements obtained in the above described manner will represent the component of the accelerating forces resolved along an axis colineal with, or parallel to, the line of movement along which mass 5 or 28 moves relative to the movement of the body on which the accelerometer is mounted. The component of an accelerating force or the resultant component of several of such forces along any given axis may, then, be determined by merely paralleling the line of relative movement of mass 5 or 28 with said given axis.

There has thus been provided a novel measuring instrument for determining the magnitude, duration and direction of accelerating forces acting upon a moving body in any desired plane as well as the components of such forces along any desired axis. Means have also been provided in combination with this novel instrument for graphically recording the measurements made by it. While there has been shown and described only two embodiments of the invention, it is to be expressly understood that the same is not limited thereto since many changes may be made in the mechanical form and arrangements of parts illustrated without departing from the spirit of the invention as will now be apparent to those skilled in the art. For example, instead of employing ammeter 39 in series with the contacts 10, 11 in Fig. 1 or the contacts 33, 34 in Fig. 4 to measure the current flowing in the circuit, a voltmeter may be used and connected across said contacts to measure the changes in voltage. Or, if instantaneous values of current or voltage are desired to be measured, then an oscillograph may be substituted for the ammeter and/or voltmeter. Then by measuring such instantaneous values or by measuring the frequency with which these values change, the acceleration forces acting upon the weight 28 may be calculated. Reference will primarily be had, therefore, to the appended claims for a definition of the limits of the invention.

What is claimed is:

1. In an instrument for measuring acceleration forces, a source of electrical energy, electro-magnetic means energized by said source and adapted to normally draw a fixed amount of energy, means for indicating the amount of said energy, and means associated with said electro-magnetic means and responsive to acceleration forces acting thereon for varying the energy in said electro-magnetic means in accordance with the magnitude and direction of said acceleration forces.

2. In an instrument for measuring acceleration forces, a movable mass, means supporting said mass for oscillating movement in response to acceleration forces acting thereon, resilient means for resisting movement of said mass in one direction, a source of electrical energy, a coil connected to said source for moving said mass against the efforts of said resilient means when said coil is sufficiently energized, said movement being controlled by the acceleration forces to be measured and in accordance with their magnitude and direction, means for varying the electrical energy in said coil as the latter moves said mass, and means for indicating the electrical energy in said coil.

3. In apparatus of the class described, a movable mass, means supporting said mass for oscillating movement in response to acceleration forces acting thereon, a fixed contact carried by said supporting means and a movable contact associated with said mass, said contacts being opened and closed by movement of said mass, resilient means for holding said contacts closed, electrical means for moving said mass against the efforts of said resilient means for opening said contacts, said movement being controlled by said acceleration forces in accordance with their magnitude and direction, a source of current for energizing said electrical means through said contacts, a resistor across said contacts for causing reduced current to flow when said contacts are open, and means for measuring the average flow of current from said source through said electrical means.

4. In an instrument for measuring the rate of change of speed of a moving body, a movable mass, means supporting said mass on said body for relative movement with respect thereto in response to the rate of change of speed of said body, a spring tending to hold said mass in one position, electro-magnetic means for moving said mass against the resilient effort of said spring, said movement being controlled by the rate of change of speed of said body, a source of electrical energy for energizing said electro-magnetic means, means for reducing the electrical energy in said electro-magnetic means when said mass is so moved, and means for measuring the energy value in said electro-magnetic means.

5. In apparatus of the class described, a movable member, means supporting said member for oscillating movement in response to acceleration forces acting thereon, the inertia of said member varying with said acceleration forces, a source of electrical energy, a continuously closed circuit including said source, means including an electromagnet in said circuit for varying the electrical energy in said circuit in accordance with said acceleration forces, and means for measuring the average value of said electrical energy.

6. In an accelerometer, a movable mass, means supporting said mass for oscillating movement in response to acceleration forces acting thereon, resilient means for resisting movement of said mass, a source of electrical energy, electrical means energized from said source for vibrating said mass, means for varying the electrical energy during each vibration in accordance with the magnitude and direction of said acceleration forces, and means for measuring the average electrical energy drawn from said source.

7. In an accelerometer, a source of electrical energy, a continuously closed electrical circuit including said source and energized by the latter, electro-magnetic means in said circuit and including a member responsive to forces of acceleration for varying the electrical energy in said circuit in accordance with the magnitude of said forces, and means for measuring the average electrical energy in said circuit.

8. In an instrument for measuring rates of change of speed, a movable mass, means supporting said mass for oscillating movement in response to the rate of change of speed, electro-magnetic means for moving said mass, said movement being controlled by the rate of change of speed, resilient means for resisting movement of said mass by said electro-magnetic means, a source of electrical energy, a continuously closed electrical circuit including said source and said electro-magnetic means, a pair of contacts in a branch of said circuit, means for opening said contacts when said mass is moved by said electro-magnetic means, an electric resistor for reducing the energy in said circuit when said contacts are open, and means for measuring the energy in said circuit.

9. In an accelerometer, a source of electrical energy, a solenoid connected to and energized by said source, an armature for said solenoid, means mounting said armature for vibration, means for increasing and decreasing the electrical energy in said solenoid during each vibration of said armature, means associated with said armature and responsive to acceleration forces for controlling the vibration of said armature in accordance with the magnitude and direction of said forces, and means for measuring the energy used by said solenoid.

10. In an instrument for measuring acceleration forces, a movable mass, means supporting said mass for oscillating movement in response to acceleration forces acting thereon, resilient means for resisting movement of said mass in one direction, a source of electric current, a coil connected to said source for moving said mass against the efforts of said resilient means when said coil is sufficiently energized by said current, said movement being controlled by the acceleration forces to be measured and in accordance with their magnitude and direction, means for reducing the current in said coil as soon as the latter moves said mass, and means for measuring the average value of the current flowing through the coil.

11. In an instrument for measuring the rate of change of speed of a moving body, a movable mass, means supporting said mass on said body for relative movement with respect thereto in response to the rate of change of speed of said body, a spring tending to hold said mass in one position, a source of electric current, electro-magnetic means connected to and energized by said source for moving said mass against the resilient efforts of said spring, said movement being controlled by the rate of change of speed of said body, means for reducing the current in said electro-magnetic means when said mass is so moved, and means for measuring the average current value in said electro-magnetic means.

12. In a measuring instrument for measuring rates of change of speed, a movable mass, means supporting said mass for oscillating movement in response to the rate of change of speed, electro-magnetic means for moving said mass, said movement being controlled by the rate of change of speed, resilient means for resisting movement of said mass by said electro-magnetic means, a source of electric current, a continuously closed electric circuit including said source and said electro-magnetic means, a pair of contacts in a branch of said circuit, means for opening said contacts when said mass is moved by said electro-magnetic means and in response to said rates of change of speed, an electric resistor for reducing the current in said circuit when said contacts are open, and means for measuring the average current flowing in said circuit.

13. In an accelerometer, a source of electric current, a solenoid connected to said source for energization thereby, an armature for said solenoid, means mounting said armature for vibration, means for increasing and decreasing the current in said solenoid during each vibration of said armature in accordance with the magnitude and direction of the acceleration forces to be measured, means associated with said armature and responsive to said acceleration forces for modifying the vibrating action of said armature in accordance with the magnitude of said acceleration forces, and means for measuring the average current drawn by said solenoid.

CHARLES I. McNEIL.